April 2, 1968   J. N. DODGEN ET AL   3,375,985
FEED GRINDING, MIXING AND DISPENSING MACHINE
Filed July 14, 1965
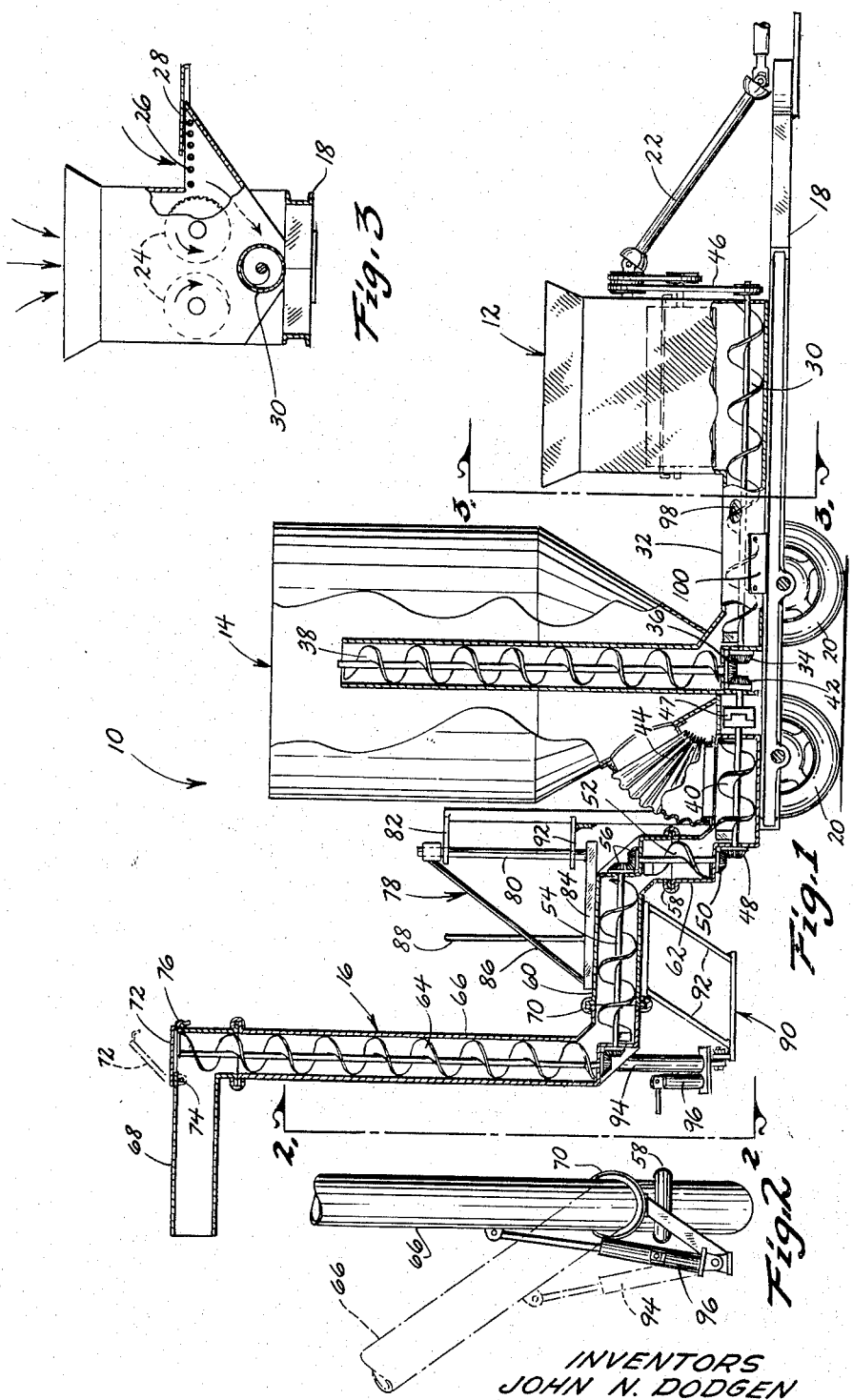
INVENTORS
JOHN N. DODGEN
KENNETH R. JOHNSON
BY Dick, Zarley, McKee + Thomte
ATTORNEYS

United States Patent Office 3,375,985
Patented Apr. 2, 1968

3,375,985
FEED GRINDING, MIXING AND
DISPENSING MACHINE
John N. Dodgen and Kenneth R. Johnson, Humboldt,
Iowa, assignors to Dodgen Industries, Inc., Humboldt, Iowa, a corporation of Iowa
Filed July 14, 1965, Ser. No. 471,871
16 Claims. (Cl. 241—98)

ABSTRACT OF THE DISCLOSURE

A feed mixing apparatus having a feed grinder at one end of a frame and a discharge unit at the opposite end of the frame, a feed mixer positioned between the grinder and the feed discharge unit and an auger conveyor interconnecting the grinder with the feed mixer and a second auger conveyor interconnecting the mixer with the discharge unit. Each of the auger conveyors transmitting power therethrough and being independent of any external power transmission means. An auger conveyor may be positioned between the two conveyors and within the feed mixer chamber and being driven by the auger conveyor communicating with the feed grinder.

---

In a grinder, mixer, and dispenser-type machine a separate power source has heretofore been employed for each of the principal operations of the machine. This has made the power train through the machine especially complicated and expensive to manufacture. Also, the incidence of repairs is higher with these machines. Normally, a series of belts or chains are employed to drive the rollers or grinders and additional chains or belts drive the mixing apparatus while similarly still further belts or chains or the like power any dispensing apparatus provided on the machine.

Also heretofore no suitable construction for a grinder mixer-type machine has been found to accommodate the addition of feed supplements to the basic grain being ground and mixed in the machine. These supplements are highly corrosive and if left in the machine will cause serious damage.

A further problem heretofore is that in dispensing the ground feed the machines have been limited in the positioning of the discharge spout thereby making it difficult to unload the feed from the machine. A still further problem has been that if the discharge spout fills up the conveyor means will jam and consequently breakage will occur.

It is therefore an object of this invention to provide a grinding, mixing and dispensing machine employing a series of interconnected feed conveying augers which serve as well as a drive train for supplying power to perform each of the free functions of the machine.

A related object of this invention is to provide a grinding, mixing and dispensing machine wherein conveyor augers are interconnected and extend from communication with the grinder unit to the discharge spout.

A further related object of this invention is to provide a grinding, mixing and dispensing machine wherein a feed supplement input opening is provided for direct communication with the grinding chamber whereby the feed supplement is always cleaned from the machine when other feed materials are added to the grinder thereby damage by the feed supplement to the machine is prevented.

A still further object of this invention is to provide a grinding, mixing and dispensing machine having a discharge dispensing unit which is adapted to pivot in both horizontal and vertical planes.

Another related object of this invention is to provide a discharge or dispensing unit which is adjustable by a self-contained jack unit which eliminates the cumbersome cables and the like.

A still further related object of this invention is to provide a dispensing unit having a safety closure means adjacent the discharge spout whereby when the discharge spout is clogged the conveyor will not be damaged.

A further object of this invention is to provide a feed grinding, mixing and dispensing machine which is simple in design, economical to manufacture and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a fragmentary, cross-sectional side elevational view of the machine of this invention;

FIG. 2 is an end fragmentary view of the machine in FIG. 1 taken along line 2—2; and FIG. 3 is a cross-sectional elevational view taken along line 3—3 in FIG. 1 showing the roller mill and the feed supplement input opening.

The grinding, mixing and dispensing implement of this invention is referred to generally in FIG. 1 by the reference numeral 10 and includes the roller mill 12, the mixing hopper 14 and the dispensing unit 16. A frame 18 mounted on wheels 20 supports the grinder 12, hopper 14 and dispensing unit 16. A drive shaft 22 is provided for engagement with the roller mill grinder 12 and turns a pair of rollers 24 (FIG. 3).

The grinder or roller mill 12 includes a supplement inlet port 26 having a closable gate 28 whereby feed supplement may be fed directly into the area of the rollers 24. An auger 30 is positioned below the rollers 24 to receive the ground feed material and supplement. An auger tube 32 extends from the roller grinder mill 12 to the mixing hopper 14. The auger 30 in the auger tube 32 is provided with a bevel gear 34 on its inner end for coaction with a bevel gear 36 on the lower end of the vertically disposed auger 38 extending upwardly in the mixing hopper 14. Similarly, an auger 40 having a bevel gear 42 engages the gear 36 for removal of the mixed feed from the mixer hopper 14 through a passageway 44.

It is seen in FIG. 1 that the drive shaft 22 is coupled through a belt 46 to the front end of the auger 30 extending from within the roller mill grinder 12 and thereby the power is transmitted through the auger 30 to the mixer auger 38 and to the auger 40 extending from the hopper 14 to the rear of the frame 18. A clutch 47 is between the gear 42 and the auger 40.

A bevel gear 48 is provided on the rear end of the auger 40 for engagement with a bevel gear 50 on the lower end of a vertically disposed auger 52 which in turn engages a horizontally disposed auger 54 through a pair of bevel gears 56. A detachable circular ring 58 interconnects a horizontal auger tube 60 for the horizontal auger 54 to a vertical auger tube 62 for the auger 52. Pivotal movement in a horizontal plane is permitted by this connection.

Extending at a right angle to the auger 54 is another auger 64 in an auger tube 66 which communicates with a spout 68 extending at right angles thereto in a horizontal plane. The auger tube 66 is rotatably connected by a detachable circular ring 70 to the horizontal auger tube 60 to permit pivotal movement about a longitudinal axis of the auger 54.

At the end of the auger tube 66, a normally closed end cap 72 is provided which is pivotally secured to the tube 66 at 74. Should the spout 68 become clogged and the feed pile up in the auger tube 66 a predetermined force upon the end cap 72 will force the end cap to pivot to its dash line open position of FIG. 1 and in doing so it will overcome the locking action of a spring latch element 76.

To provide pivotal support for the horizontal auger 54 and the vertical auger 64, a triangular in shape frame assembly 78 is provided. A vertically disposed shaft 80 is positioned above the auger 52 and is coaxial therewith. The shaft 80 is adapted to pivot relative to a pair of support arms 82. A horizontally disposed frame portion 84 is secured to the lower end of the shaft 80 and is also secured along the top of the auger tube 60. A diagonally disposed frame member 86 extends from the outer end of the frame portion 84 to the upper end of the shaft 80. A handle 88 is secured to the horizontal frame portion 84 in spaced relationship to the shaft 80 to give sufficient leverage for manually pivoting the discharge augers 54 and 64 about an axis extending coaxially of the shaft 80 and the auger 52.

A further support frame 90 is pivoted for the auger 64 and its auger tube 66. This frame includes a pair of members 92 extending from the lower side of the auger tube 60 outwardly and downwardly to a point under the auger tube 66. A unitary hydraulic jack 94 extends from the lower end of the frame 90 to a point intermediate the ends of the auger tube 66. Accordingly, by operation of a pump 96 connected to the pack 94 the auger tube 66 may be caused to pivot in a vertical plane about an axis through the auger 54 as seen in FIG. 2. Thus it is seen that all of the augers in the machine 10 are driven by being connected end-to-end and accordingly the feed material is transferred from the grinder or roller mill 12 to the mixing hopper 14 and then into the discharge unit 16 and out the spout 68. No separate belts or chains are used to operate the various augers 38, 40, 52, 54 and 64. A single auger 30 serves to drive all of these individual augers in a chain fashion. Moreover it is to be appreciated that by introducing the supplement directly into the grinding or roller chamber of the unit 12 the supplement is cleaned therefrom and is prevented from corroding the machine 10. Moreover, a better mixing of the supplement with the grain being ground is accomplished.

To check on the flow of feed material through the system, a window 98 is provided in the auger tube 32 between the grinder unit 12 and the hopper 14. Also, a removable plate 100 is provided on the lower side of the auger tube 32 for inspecting and cleaning if necessary.

Unlimited versatility is provided in the discharge unit 18 since the unit incorporates a double swivel principle by the auger 54 being capable of pivotal movement relative to the vertical auger 52 while the vertical auger 64 is pivotally mounted for movement about the longitudinal axis of the auger 54. Thus as shown in FIG. 1 the discharge unit 16 is capable of extending rearwardly a substantial distance from the hopper 14 and the vertically disposed tube 66 may be pivoted in a vertical plane to any desired position by the operation of the pack 94. When the discharge unit 16 is not in use the horizontal auger tube 60 may be pivoted to a transversely extending position and the auger tube 66 pivoted forwardly to a generally horizontally extending position along side the hopper 14 and thereby the machine 10 is ready for transporting.

As noted, if when unloading the hopper 14 the spout 68 should become filled the end cap 72 will pivot to an open position as shown by the dash lines in FIG. 1 since the latch 76 is designed to release under a predetermined pressure.

Some changes may be made in the construction and arrangement of our feed grinding, mixing and dispensing machine without departing from the real spirit and purpose of our invention, and it is our intention to cover by our claims, any modified forms of structure or use of mechanical equivalents which may be reasonably included within their scope.

We claim:
1. In combination, a frame, a feed grinder arranged on said frame, a feed mixer positioned on said frame and a feed discharge unit secured to said frame, a first conveyor means in communication between said grinder and said mixer, a second conveyor means in communication between said mixer and said discharge unit, power means connected to a portion of said first conveyor adjacent said grinder, means interconnecting adjacent ends of said first and second conveyors, said power means adapted to transmit power through said first conveyor to said second conveyor and said second conveyor being adapted to transmit power to said discharge unit.

2. The structure of claim 1 wherein said first and second conveyors are further defined as being auger conveyors.

3. In combination, an elongated frame, a feed grinder arranged at one end of said frame, a feed discharge unit positioned at the opposite end of said frame, a feed mixer arranged between said feed grinder and said feed discharge unit, a first feed conveyor in communication with said feed grinder and said feed mixer, a second feed conveyor in communication with said feed discharge unit and said feed mixer, said first and second feed conveyors disposed in a common plane, means interconnecting adjacent end portions of said first and second conveyors, power means connected to said first feed conveyor whereby said second feed conveyor may be operated by and through said first feed conveyor.

4. The structure of claim 1 wherein said discharge unit includes a third feed conveyor connected to said second feed conveyor for operation through said second feed conveyor by said power means connected to said first feed conveyor.

5. The structure of claim 1 wherein said discharge unit includes a third feed conveyor connected to said second feed conveyor for operation by said power means connected to said first feed conveyor and said first, second and third feed conveyors being connected in series and being further defined as being auger type conveyors.

6. In combination, an elongated frame, a feed grinder arranged at one end of said frame, a feed discharge unit positioned at the opposite end of said frame, a feed mixer arranged between said feed grinder and said feed discharge unit, a first feed auger conveyor in communication with said feed grinder and said feed mixer, a second feed auger conveyor in communication with said feed discharge unit and said feed mixer, means interconnecting adjacent end portions of said first and second auger conveyors, an auger mixer feed conveyor disposed within said feed mixer and said means for interconnecting said adjacent end portions of said first and second conveyors being at one end of said mixer auger feed conveyor, power means connected to said first feed conveyor whereby said second feed auger conveyor and said mixer auger feed conveyor may be operated by and through said first feed auger conveyor.

7. In combination, an elongated frame, a feed grinder arranged at one end of said frame, a feed discharge unit positioned at the opposite end of said frame, a feed mixer arranged between said feed grinder and said feed discharge unit, a first feed auger conveyor in communication with said feed grinder and said feed mixer, a second feed auger conveyor in communication with said feed discharge unit and said feed mixer, said first and second feed auger conveyors disposed in a common plane and having a common longitudinal axis, means interconnecting adjacent end portions of said first and second auger conveyors, and auger mixer feed conveyor disposed within said feed mixer and said means for interconnecting said adjacent end portions of said first and second conveyors being one end of said mixed auger feed conveyor, said discharge unit including a discharge feed auger conveyor connected at one end to said second feed auger conveyor, power means connected to said first feed conveyor whereby said second feed auger conveyor and said mixer auger feed conveyor and said discharge feed auger conveyor may be operated by said first feed auger conveyor.

8. The structure of claim 7 wherein a feed supplement access opening is provided in communication with said first feed auger conveyor at a point in said grinder.

9. The structure of claim 7 wherein said discharge feed auger conveyor includes a first auger portion and a second auger portion; said first auger portion being pivotally connected to said second feed auger conveyor and adapted to be driven thereby, said second auger portion pivotally connected to said first auger portion and adapted to be driven thereby, said first and second auger portions adapted to pivot in planes being perpendicular to each other.

10. The structure of claim 9 and a unitary self-contained hydraulic jack is connected to said second auger portion for selectively pivoting said second auger portion to a desired discharge position.

11. The structure of claim 9 wherein said second auger conveyor includes a vertically disposed auger section interconnecting said first auger portion and said first auger portion is horizontally disposed.

12. The structure of claim 9 and a discharge spout is rotatably mounted on the outer end of said second auger portion and adapted to rotate about the longitudinal axis of said second auger portion.

13. The structure of claim 9 and a discharge spout is mounted on the outer end of said second auger portion and a normally closed yieldable closure means is provided at the outer end of said second auger portion adjacent the inner end of said discharge spout, said closure means adapted to open upon the application of a predetermined force.

14. The structure of claim 11 and a jack frame extends downwardly from said horizontally disposed first auger portion to a point below said second auger portion, a unitary elongated jack having one end connected to said second auger portion at a point spaced from its inner end and its opposite end connected to the lower end of said jack frame.

15. The structure of claim 11 and a vertical frame portion is vertically disposed above said vertical auger section and rotatably secured to said frame, a horizontal frame portion secured to said first auger portion, a diagonally extending frame member extending between the upper end of said vertical frame portion and the outer end of said horizontal frame portion whereby said first auger portion is adapted to pivot in a horizontal plane about the longitudinal axis of said vertical frame portion and said vertical auger section.

16. The structure of claim 6 wherein said feed mixer auger is positioned in a tube which is imperforate at its lower end and along its substantial length, said tube and auger therein extending within and to adjacent the top of said feed mixer chamber, the lower end of said feed mixer auger tube being in direct communication with said first feed auger whereby said feed is adapted to be moved up through said feed mixer auger tube and out the top into said chamber, said second feed auger conveyor being in communication with said chamber adjacent the lower end thereof.

References Cited
UNITED STATES PATENTS

| | | | |
|---|---|---|---|
| 2,815,941 | 12/1957 | Schmale | 241—101 X |
| 2,833,485 | 5/1958 | Rothhaar | 241—101 |
| 3,133,727 | 5/1964 | Luscombe | 241—98 |
| 3,194,288 | 7/1965 | Dodgen et al. | 146—79 |
| 3,199,796 | 8/1965 | Callum et al. | 241—101 |
| 3,301,291 | 1/1967 | Hughes | 241—186 X |

WILLIAM W. DYER, JR., *Primary Examiner.*

W. D. BRAY, *Assistant Examiner.*